Oct. 23, 1945.  R. S. GARBER  2,387,387
TRACK FOR TRACK-LAYING VEHICLES
Filed Sept. 30, 1943
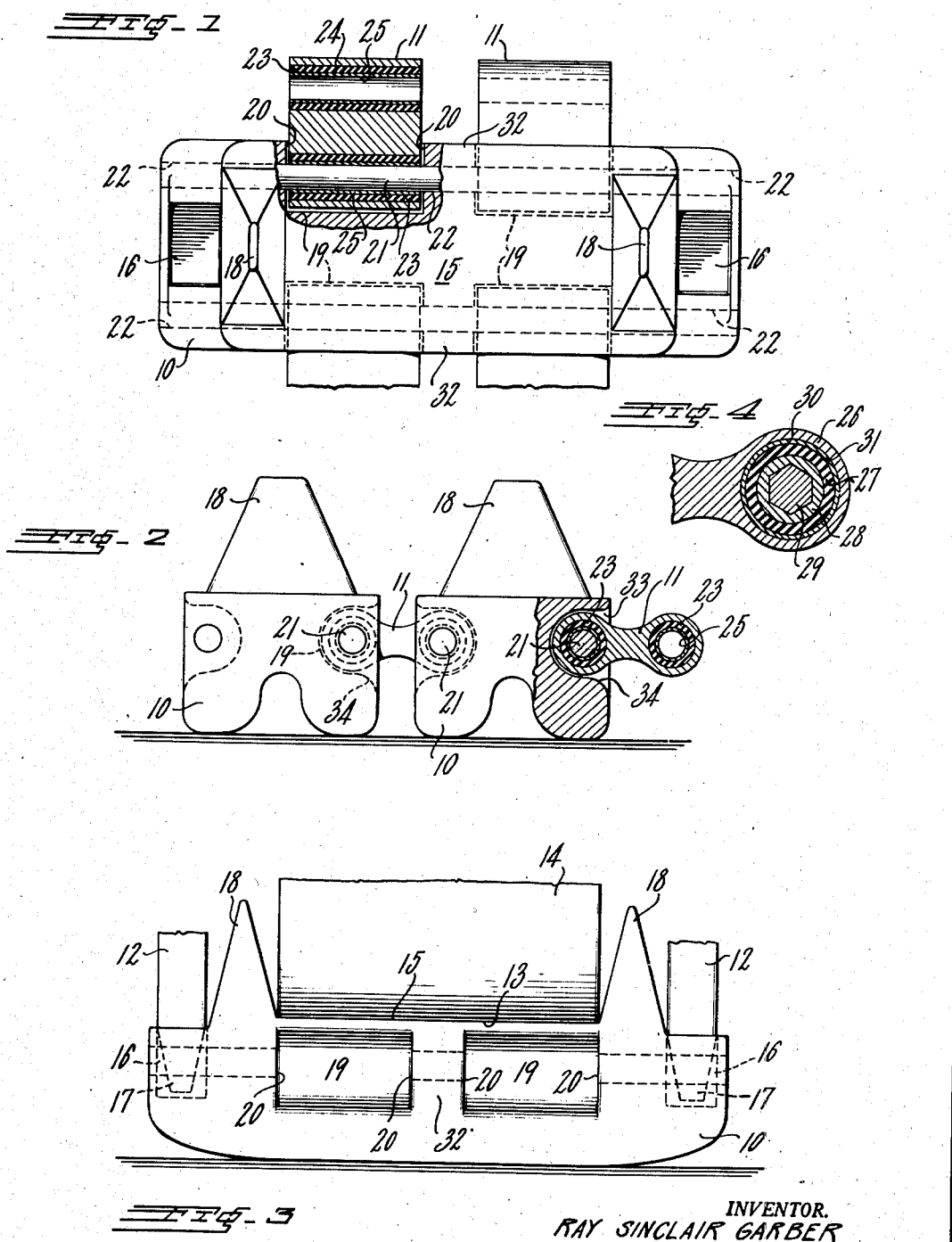
INVENTOR.
RAY SINCLAIR GARBER
BY
ATTORNEY Patented Oct. 23, 1945

2,387,387

UNITED STATES PATENT OFFICE 2,387,387

TRACK FOR TRACK-LAYING VEHICLES

Ray S. Garber, Montreal, Quebec, Canada, assignor to United States Rubber Company, New York, N. Y., a corporation of New Jersey Application September 30, 1943, Serial No. 504,424
In Canada October 31, 1942

3 Claims. (Cl. 305—10)

This invention relates to improvements in a track for track-laying vehicles provided with a plurality of tread blocks connected by resiliently bushed connecting links pivoted on pins fixed in the tread blocks. The invention relates particularly to the means for preventing the pins from bending and to means for facilitating the assembly of the track and the replacement of the parts.

In endless articulated tracks used heretofore in track-laying vehicles, the joints therein have been provided with rubber bushings around the connecting pins. Such bushings have been positioned in the tread blocks or in both the tread blocks and the connecting links. In such construction, substantially the entire length of the connecting pins is surrounded with rubber bushings, and as the rubber is resilient, the pins can bend within the surrounding rubber from end to end, similar to the case where a beam is supported at each end and the load is carried in the middle.

In accordance with the present invention, the tread blocks are provided with recesses on their opposite sides having end walls between which the ends of links connecting the adjacent blocks are pivoted on pins extending from one side of the block to the other and passing through rubber bushings in the ends of the links. In this construction, the pins are firmly anchored in the end walls of the recesses, and the ends of the bushings are placed in closely spaced relation to the end walls of the recesses, with the result that the pins are firmly supported in the blocks at relatively short intervals which prevent them from bending. Another advantage of this construction is that the bushings are positioned in the links which are smaller than the blocks, and consequently it is easier and less costly to replace a wornout bushing than it would be if it were located in the block. Furthermore, the links can be readily replaced in the field because the pins are located in openings which extend through the blocks and can be easily driven out of the blocks for the replacement of the links.

An embodiment of this invention is hereinafter described in reference to the accompanying drawing in which:

Fig. 1 is a plan view partly in section of a portion of a track for a track-laying vehicle embodying this invention, and showing a single tread block and its connecting links;

Fig. 2 is a side-view of a portion of the track, or an end view of two of the blocks and the connecting links, with parts in section;

Fig. 3 is a side-elevational view of one of the tread blocks, showing the relation of the bogie wheels which support the vehicle, the driving sprockets, and the ground supporting surface in respect to the tread block; and Fig. 4 is an enlarged cross-sectional view of a modification of the invention, taken through a connecting link, a resilient bushing, and a connecting pin.

Referring to the drawing, the track as illustrated herein has a plurality of tread blocks 10 connected by a plurality of links 11, so as to form an endless articulated track, and to provide a pivotal movement between the blocks to permit them to pass around the driving sprockets 12 shown in Fig. 3. Such sprockets are placed at one end of the track, in accordance with the usual construction and such relationship is therefore not shown. The vehicle is supported on the outer periphery 13 of the bogie wheels 14 (only one being shown in Fig. 3), which travel on the flat surfaces 15 of the tread blocks 10. The tread blocks 10 are provided with the usual recesses 16, with which the sprocket teeth 17 mesh, and with guide projections 18 which keep the track in alignment with respect to the bogie wheels 14 and the sprockets 12. For the purpose of simplifying the illustration of the invention, only the outer circumferences of the sprockets 12 and the bogie wheels 14 are shown.

The opposite sides of the blocks are provided with recesses 19 having end walls 20 between which the connecting links 11 are pivoted on pins 21, which extend through the recesses 19, and are secured against rotation in openings 22 in the end walls 20 on the opposite sides of the recesses 19. The recesses 19 form in conjunction with the openings 22 continuous passages or openings through the tread blocks 10 for the reception of continuous pins 21.

Each of the ends of the links 11 is provided with a resilient bushing 23, which may be elastic rubber, either natural or synthetic, or the like. The outer radial surface 24 of the resilient bushing 23 is secured against rotation in respect to the connecting link 11, and its inner radial surface is secured against rotation in respect to a metal bushing 25, through which the connecting pin 21 extends and is secured against rotation in respect thereto. Any of the known methods may be used for securing the rubber bushing 23 against rotation in respect to the link 11 and the metal bushing 25, such as by forming a vulcanizing bond between these members, or by adhesively securing the rubber to the metal, or by forcing the rubber into the bore in the link 11 between it and the metal bushing 25. Relative rotation between the pin 21 and the openings 22 in the block 10 and the inner radial surface of the bushing 25 may be prevented by the frictional engagement of the pin with these parts, such as for example by forcing the pin in the openings with a tight but removable fit.

For the purpose of reducing the maximum torsional stress imparted to the rubber bushings 23 when they pass around the sprockets 12, or end supporting wheels of the track, the bushings are subjected to initial torsional stresses in the proper direction when the centers of the bushings in the same link 11 lie on the line connecting the centers of the pin openings 22 in the blocks 10, to which the links are connected. To accomplish the above, the pins 21 are driven through the bushings 25 when the angular relation of the links 11 and the blocks 10 are such that after being moved until the centers of the bushings in the same link and the centers of the openings in the connected block lie in a straight line, then the outer surfaces of the bushings 25 in the left ends of the links 11 will be rotated through an angle in the clockwise direction, and the outer surfaces of the bushings 25 in the right ends of the links 11 will be rotated through an angle in the counter-clockwise direction in respect to the inner surfaces of the bushings 25. The angles of rotation should be equal to about one-half the maximum angular movement of the links 11 in respect to the blocks 10 during their travel around the sprockets 12, or the end supporting wheels of the track.

The pin 21 may be secured against rotation in respect to the block 10 and the inner metal bushing 25 by making the openings 22 in the blocks and the opening in the bushing 25 of a non-circular shape, such for example as hexagonal in cross-section, and making the pin of the corresponding shape and slightly smaller in size, as shown in Fig. 4, which is a cross-sectional view of a modified form taken through the connecting link 26, rubber bushing 27, inner metal bushing 28, and pin 29, corresponding to the similar members in Figs. 1 and 2. The rubber bushing 27 may be formed separately from the link 26, and provided with an outer metal shell 30, which may be subsequently shrunk and forced into the bore 31 in the end of the link 26, so as to compress the rubber 27 by shrinkage of the shell 30 and also to form a pressed fit between the shell 30 and the bore 31 in the link 26, and thereby secure the outer radial surface of the rubber bushing 27 from rotating in respect to the link 26. The outer and inner radial surfaces of the rubber 26 may be secured against rotation respectively in respect to the outer shell 30 and the inner metal bushing 28 in accordance with any of the methods described in reference in Figs. 1 to 3.

Where the pin 29 and the openings into which it fits is of a non-circular, or hexagonal shape as shown, it is not necessary to provide as tight a fit between the outer surfaces of the pin and the walls of the opening as in the case where the pin and the openings are of a circular shape as shown in Figs. 1 to 3, in order to prevent the rotation of the parts with respect to one another. The pins 29 may be secured against longitudinal movement with a set screw, or the like extending through the walls of the opening 22 in the block 10 and against the pin 29.

As shown in Figs. 1 to 3, two links 11 are arranged side by side on the opposite sides of the blocks 10 so as to connect the blocks with dual parallel rows of such links. A projection of metal 32 on each side of the blocks 10 separate the rows of links. The opposite sides of the projections 32 form the adjacent end walls 20 of the adjacent recesses 19 into which the ends of the links 11 extend. If desired, a single row of links could be used, but in order to provide a large rubber supporting area and at the same time firmly support the pins in the blocks 10 at relatively closely spaced points, it is desirable to use more than one row of links.

Another advantage of this track construction is that the recesses 19 are provided with top walls 33 and bottom walls 34 which protect the links 11 and their bushings from engagement with foreign objects they might encounter on the ground.

As shown in both forms of the invention, the tendency of the pins 21 and 29 to bend is reduced by positively anchoring them in the openings 22 of the tread blocks 10, and spacing the ends of the bushings 25 and 28 relatively close to the end walls 20 of the recesses 19, and as the aligned openings 22 in the blocks 10 form in conjunction with the recesses 19 continuous passages through the blocks 10, the pins 21 and 29 can be readily driven through the blocks 10 to facilitate the assembly and the replacement of the track members. Furthermore, the resilient bushings are the most fragile portion of the track, and as they are located in the links, which are the smaller and less expensive than the tread blocks, the replacement of the resilient bushings can be effected with less cost than if they were located in the blocks 10. A further advantage is obtained by placing the bushings in the links instead of in the blocks since the bushings can be better inspected and tested when in the links.

While the preferred forms of this invention have been described, it will be understood that changes in the detail may be made without departing from the spirit of the invention and the scope of the appended claims, and it is desired to cover the invention as broadly as permitted by the prior art.

Having thus described my invention, what I claim and desire to protect by Letters Patent is:

1. A track for a track-laying vehicle comprising tread blocks, each of said tread blocks having recesses on opposite sides thereof and a tread surface, each of said recesses having opposite end walls provided with coaxial openings extending parallel to said tread surface and transversely to the length of said track, a pin extending through each of said recesses and into said openings on each end thereof, said pin being removable but being fixed against rotation in said openings, links for pivotally connecting said blocks, each of said links having a resilient bushing in each end, through which one of said pins extends, said bushings being subjected to torsional stresses by an angular displacement of the outer surface of said bushing with respect to the original molded position of the inner surface of said bushing when the center lines of said bushings in any link are aligned with the center lines of said openings in the block to which said link is connected, said angular displacement being substantially equal to one-half of the operating angular movement of said link and block and in the opposite direction to such angular movement, and the walls of said links at the ends of said bushings being in closely spaced relation to said opposite walls of said recesses.

2. A track for a track laying vehicle comprising a plurality of one-piece tread blocks pivotally connected by a plurality of links, each block having a top surface adapted to form a track for supporting the wheels of the vehicle and a bottom tread surface, each end of said links having a resilient bushing secured therein, recesses on opposite sides of said block adapted to receive the ends of said links, said recesses having opposite end walls provided with coaxial openings, a pin extending through said openings of each recess and through the bushing in said recess, and said recesses having top and bottom walls which overhang said pin therein.

3. A track for a track-laying vehicle comprising tread blocks, each of said tread blocks having recesses on opposite sides thereof and a tread surface, each of said recesses having top, bottom, back and end walls which enclose said recesses in all directions, excepting in the lengthwise direction of said track, said recess and walls having coaxial openings which form in conjunction with said recess a continuous opening through said tread block extending transversely of the length of said track, a continuous pin extending through said recess and fixed against rotation in said openings on the opposite ends of said recess, links for pivotally connecting said blocks, each of said links having a resilient bushing in each end thereof whose outer radial walls are secured against rotation in respect to said link, one of said bushings in each link being positioned in said recess in one block and the other of said bushings being positioned in an adjacent recess in the adjacent block of said track, said pins in said blocks extending through said bushings and secured therein against rotation in respect to the inner radial surface of said bushings, and the end walls of said bushings being in closely spaced relation to said end walls of said recesses.

RAY S. GARBER.